(12) United States Patent  
Omori

(10) Patent No.: US 12,553,375 B2  
(45) Date of Patent: Feb. 17, 2026

(54) ENGINE

(71) Applicant: Yanmar Holdings Co., Ltd., Osaka (JP)

(72) Inventor: Ryohei Omori, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 5 days.

(21) Appl. No.: 18/657,809

(22) Filed: May 8, 2024

(65) Prior Publication Data

US 2024/0418117 A1 Dec. 19, 2024

(30) Foreign Application Priority Data

Jun. 16, 2023 (JP) .................. 2023-099178

(51) Int. Cl.
*F01N 13/18* (2010.01)
*F01P 5/02* (2006.01)

(52) U.S. Cl.
CPC ............ *F01N 13/1811* (2013.01); *F01P 5/02* (2013.01)

(58) Field of Classification Search
CPC ................................ F01N 13/1811; F01P 5/02
See application file for complete search history.

(56) References Cited

U.S. PATENT DOCUMENTS

| | | | |
|---|---|---|---|
| 9,624,814 B2 * | 4/2017 | Mitsuda | F01N 13/10 |
| 2012/0311984 A1 * | 12/2012 | Mitsuda | F01N 13/1838 55/508 |
| 2014/0352282 A1 * | 12/2014 | Mitsuda | F02D 41/1448 60/282 |
| 2015/0226101 A1 * | 8/2015 | Nishimura | F01N 3/103 123/456 |
| 2016/0024752 A1 * | 1/2016 | Mitsuda | E02F 9/0866 180/296 |
| 2017/0009639 A1 * | 1/2017 | Mitsuda | F01N 13/08 |
| 2017/0218822 A1 * | 8/2017 | Yamashita | F01N 13/18 |
| 2024/0167407 A1 * | 5/2024 | Hyun | F01N 3/035 |

FOREIGN PATENT DOCUMENTS

| | | | | |
|---|---|---|---|---|
| EP | 4001605 A1 * | 5/2022 | | A01D 34/64 |
| JP | 2011117385 A * | 6/2011 | | |
| JP | 2012072723 A * | 4/2012 | | |
| JP | 2012136845 A * | 7/2012 | | |
| JP | 2013148007 A * | 8/2013 | | F01N 13/008 |
| JP | 2014040835 A * | 3/2014 | | |

(Continued)

OTHER PUBLICATIONS

Translation EP-4001605-A1 (Year: 2024).*

(Continued)

*Primary Examiner* — J. T. Newton
(74) *Attorney, Agent, or Firm* — Chris Mizumoto

(57) ABSTRACT

An exemplary engine includes an engine main-body, an exhaust-gas purification device having a first case and a second case, and a bracket for mounting the exhaust-gas purification device onto the engine main-body. The bracket has a first-case mounting portion mounted on the first case, a second-case mounting portion mounted on the second case, and a coupling portion coupling the first-case mounting portion and the second-case mounting portion.

7 Claims, 10 Drawing Sheets

(56) References Cited

FOREIGN PATENT DOCUMENTS

JP          2018017178  A  *  2/2018

OTHER PUBLICATIONS

Translation JP-2011117385-A (Year: 2024).*
Translation JP-2012072723-A (Year: 2024).*
Translation JP-2012136845-A (Year: 2024).*
Translation JP-2013148007-A (Year: 2024).*
Translation JP-2014040835-A (Year: 2024).*
Translation JP-2018017178-A (Year: 2024).*
Translation D1 = JP 2018-17178 (Year: 2025).*

* cited by examiner

ENGINE

CROSS-REFERENCE

This application claims foreign priority of JP2023-099178 filed Jun. 16, 2023, the disclosure of which is hereby incorporated by reference in its entirety.

TECHNICAL FIELD

The present invention relates to an engine.

BACKGROUND ART

Conventionally, an engine in which an exhaust-gas purification device is disposed above an engine main-body is known (for example, see Patent Document 1). The engine device disclosed in Patent Document 1 includes a plurality of support legs erected on a cylinder head and a rectangular support base placed on upper ends of these plurality of support legs. The exhaust-gas purification device is supported in a state of being disposed on the rectangular support base.

PRIOR ART DOCUMENT

Patent Document

Patent Document 1: Japanese Unexamined Patent Application Publication No. 2015-83803

SUMMARY OF INVENTION

Technical Problem

When a large support base for supporting the exhaust-gas purification device is disposed above the engine main-body, there is a concern that the weight of the engine will increase. On the other hand, if the support base is eliminated in order to reduce the weight, there is a concern that support strength of the exhaust-gas purification device will lower.

In view of the above, an object of the present invention is to provide an art capable of suppressing lowering in the support strength while reducing the weight of a member that supports an exhaust-gas purification device in an engine.

Solution to Problem

An exemplary engine according to the present invention includes an engine main-body, an exhaust-gas purification device having a first case and a second case, and a bracket for mounting the exhaust-gas purification device onto the engine main-body. The bracket includes a first-case mounting portion mounted on the first case, a second-case mounting portion mounted on the second case, and a coupling portion coupling the first-case mounting portion and the second-case mounting portion.

Advantageous Effects of Invention

According to the exemplary present invention, in an engine, the lowering in the support strength can be suppressed while reducing the weight of a member that supports an exhaust-gas purification device.

DESCRIPTION OF EMBODIMENTS

Figure 1:
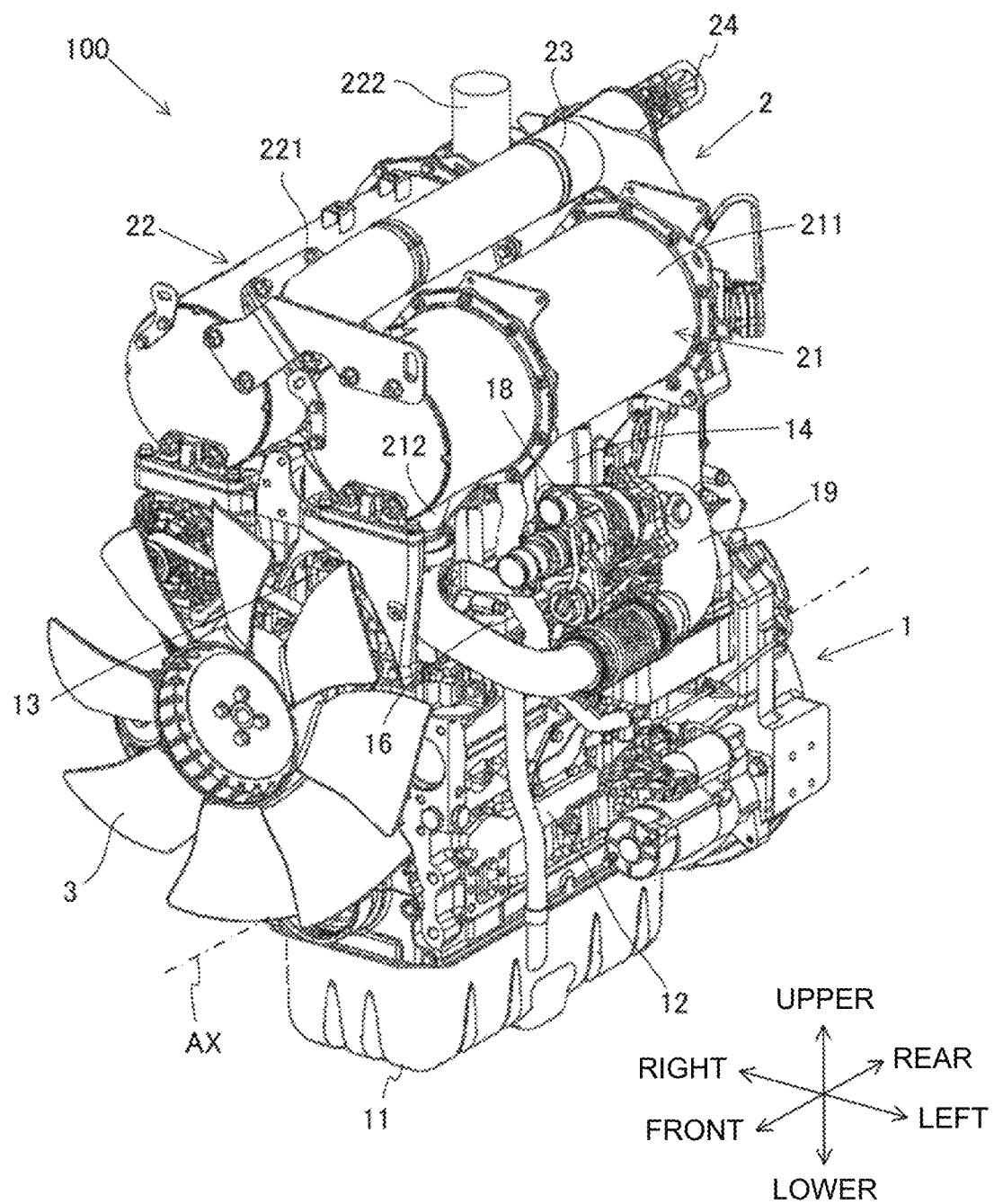
FIG. 1 is a perspective view showing a schematic constitution of an engine.

Hereinafter, an exemplary embodiment of the present invention will be explained in detail with reference to the drawings. Note that, in the drawings, the same or corresponding parts are denoted by the same reference characters, and explanation thereof will not be repeated unless otherwise required.

1. Overview of Engine

Figure 2:
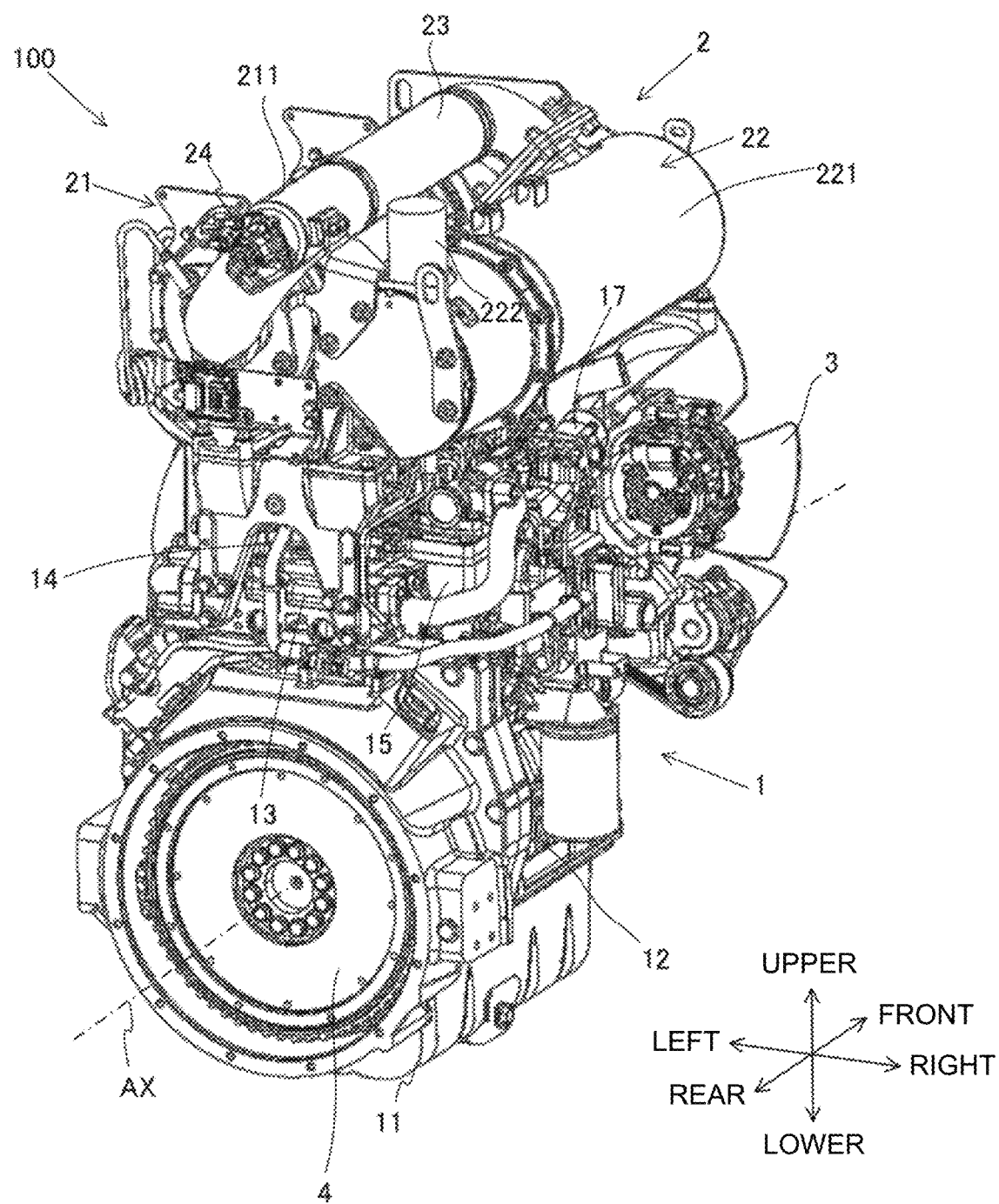
FIG. 2 is a perspective view showing a schematic constitution of an engine.

FIG. 1 and FIG. 2 are perspective views showing a schematic constitution of an engine 100 according to an embodiment of the present invention. Note that, a direction in which the engine 100 is viewed is different between FIG. 1 and FIG. 2. The engine 100 of this embodiment is a diesel engine and is mounted on, for example, an agricultural machine such as a tractor or a construction machine such as a skid steer loader. The engine 100 is constituted as an in-line four-cylinder engine in which four cylinders are arranged in line. The number of cylinders provided in the engine is not limited to four but may be the other numbers.

Here, directions in this Description are defined as follows. A one-dot chain line AX in FIG. 1 and FIG. 2 indicates an axis of a crankshaft (not shown) of the engine 100, and a direction in which the axis AX extends (crankshaft direction) is defined as a front-rear direction. FIG. 1 is a view seen from diagonally front. FIG. 2 is a view seen from diagonally rear. Moreover, a lateral direction perpendicular to the front-rear direction is defined as a left-right direction. A left side and a right side as viewed from the rear to the front are defined as "left" and "right", respectively. Furthermore, the gravity direction perpendicular to the front-rear direction and the left-right direction is defined as an up-down direction, an upstream side in the gravity direction is defined as "upper", and a downstream side as "lower". Note that, these directions are names used merely for the explanation and are not intended to limit actual positional relationships or directions.

As shown in FIG. 1 and FIG. 2, the engine 100 includes an engine main-body 1 and an exhaust-gas purification device 2.

1-1. Engine Main-Body

The engine main-body 1 includes an oil pan 11, a cylinder block 12, a cylinder head 13, and a head cover 14.

The oil pan 11 is provided at an end part on a lower side of the engine 100. The oil pan 11 is formed with a container shape whose upper side is open. Engine oil for lubricating the engine 100 is stored in the oil pan 11.

The cylinder block 12 is mounted on an upper side of the oil pan 11. On a lower part of the cylinder block 12, a recessed portion for accommodating a crankshaft (not shown) and the like extending in the front-rear direction is formed. A plurality of cylinders (not shown) aligned at intervals in the front-rear direction are formed on an upper part of the cylinder block 12. Each of the cylinders extends in the up-down direction. Note that, in this embodiment, the engine 100 is an in-line four-cylinder engine, and the number of cylinders is four. Each of the cylinders accommodates a piston (not shown) connected to the crankshaft via a connecting rod (not shown). Inside the cylinder, the piston can move in the up-down direction. The crankshaft rotates around the axis AX as the piston reciprocates in each cylinder.

The cylinder head 13 is mounted on the upper side of the cylinder block 12. A combustion chamber corresponding to each cylinder is formed by the cylinder head 13 and the cylinder block 12. On a right side surface of the cylinder head 13, an intake manifold 15 is disposed. On a left side surface of the cylinder head 13, an exhaust manifold 16 is disposed. Hereinafter, a side (right side) of the engine main-body 1 on which the intake manifold 15 is mounted is referred to as an intake side in some cases. Moreover, a side (left side) of the engine main-body 1 on which the exhaust manifold 16 is mounted is referred to as an exhaust side in some cases.

The intake manifold 15 distributes air supplied through an intake pipe 17 to each cylinder and supplies the air to the combustion chamber formed in each cylinder. In each of the combustion chambers, the air supplied from the intake manifold 15 is compressed and then, fuel supplied from a fuel supply portion (not shown) is injected. As a result, combustion occurs in the combustion chamber, and the piston can be reciprocated up and down. Power obtained as above is transmitted to various devices on the downstream side of the power via the crankshaft or the like.

Note that, in this embodiment, a turbocharger 18 is provided on the left side surface of the engine 100. That is, the turbocharger 18 is provided on the exhaust side of the engine 100. The turbocharger 18 has a turbine and a compressor (none of them is shown) accommodated therein. The turbine is rotated by energy of the exhaust gas flowing from the exhaust manifold 16, and the compressor is rotated together with the turbine. By means of the rotation of the compressor, air purified by an air cleaner (not shown) is compressed and sent to each of the cylinders via a pipe (not shown) and the intake manifold 15.

The exhaust manifold 16 collects the exhaust gas generated in each of the combustion chambers. The exhaust gas in the exhaust manifold 16 flows to the turbocharger 18 via a pipe, not shown, drives a turbine of the turbocharger 18 and then, passes through a connection pipe 19 and flows to the exhaust-gas purification device 2 (ATD: After Treatment Device).

The head cover 14 is disposed above the cylinder head 13. Inside the head cover 14, a valve operating mechanism (not shown) constituted by a push rod, a rocker arm and the like for causing an intake valve and an exhaust valve (none of them is shown) to operate is accommodated.

In addition, a cooling fan 3 is rotatably mounted on the front side of the engine main-body 1. That is, the engine 100 includes the cooling fan 3 disposed in front of the engine main-body 1. The cooling fan 3 is rotated by power transmitted from the crankshaft. The cooling fan 3 generates a flow of air by rotating, causes the air to pass through a radiator (not shown) for cooling the cooling water of the engine 100, and causes wind to hit the engine main-body 1. As a result, the engine main-body 1 is cooled.

Moreover, a flywheel 4 is disposed on the rear side of the engine main-body 1. That is, the engine 100 includes the flywheel 4 disposed on the rear of the engine main-body 1. The flywheel 4 is mounted on a rear end of the crankshaft. The flywheel 4 rotates integrally with the crankshaft and is used to take out power from the engine 100.

1-2. Exhaust-Gas Purification Device

The exhaust-gas purification device 2 is a device that performs post-treatment of the exhaust gas. The exhaust-gas purification device 2 purifies the exhaust gas by removing harmful components such as nitrogen oxides (NOx), carbon monoxide (CO), and hydrocarbons (HC) and particulate matters (Particulate Matter) contained in the exhaust gas.

As shown in FIG. 1 and FIG. 2, the exhaust-gas purification device 2 includes a Diesel Particulate Filter (DPF) device 21 and a Selective Catalytic Reduction (SCR) device 22.

The DPF device 21 removes carbon monoxide, nitrogen monoxide, particulate matters, and the like contained in the exhaust gas by using an oxidation catalyst and a filter accommodated in the DPF case 211. The oxidation catalyst is composed of platinum or the like and oxidizes (burns) unburned fuel, carbon monoxide, nitrogen monoxide or the like contained in the exhaust gas. The filter is disposed on the downstream side of the exhaust gas from the oxidation catalyst and is constituted as a fall-flow type filter, for example. The filter collects the particulate matters contained in the exhaust gas treated by the oxidation catalyst.

The SCR device 22 removes NOx contained in the exhaust gas via an SCR catalyst and a slip catalyst accommodated in an SCR case 221. The SCR catalyst is constituted by a material such as ceramic that adsorbs ammonia. NOx contained in the exhaust gas is reduced by being brought into contact with the SCR catalyst having adsorbed ammonia and is changed into nitrogen and water. The slip catalyst is used to prevent ammonia from being discharged to the outside. The slip catalyst is a catalyst such as platinum that oxidizes ammonia, and oxidizes ammonia to change it into nitrogen and water.

Each of the DPF case 211 and the SCR case 221 is constituted by a substantially cylindrical hollow member extending in the front-rear direction. The DPF case 211 and the SCR case 221 are disposed side by side in the left-right direction above the engine main-body 1. In detail, the DPF case 211 is disposed on the left side of the engine 100, that is, on the exhaust side. The SCR case 221 is disposed on the right side of the engine 100, that is, on the intake side. Note that the DPF case 211 is an example of a first case of the present invention, and the SCR case 221 is an example of a second case of the present invention. That is, the exhaust-gas purification device 2 has the first case 211 and the second case 221. Above the engine main-body 1, the first case 211 and the second case 221 extend with longitudinal directions in the front-rear direction and are aligned in parallel in the left-right direction.

On a plan view from above, an inter-case piping 23 extending in the front-rear direction is disposed between the DPF case 211 and the SCR case 221 in the left-right direction. In detail, the inter-case piping 23 is disposed above the DPF case 211 and the SCR case 221. A rear end part of the DPF case 211 is connected to an end part on the rear side of the inter-case piping 23. A front part of the SCR case 221 is connected to an end part on the front side of the inter-case piping 23.

On a front end part of the DPF case 211, an inlet piping 212 (see FIG. 1) protruding downward is provided. The inlet piping 212 is connected to the above-described connection pipe 19. The exhaust gas that has driven the turbine of the turbocharger 18 is led into the DPF case 211 via the connection pipe 19 and the inlet piping 212.

Inside the DPF case 211, the exhaust gas flows from the front end part to the rear end part and is treated by the DPF device 21. The exhaust gas that has passed through the DPF case 211 flows into the inter-case piping 23. In the inter-case piping 23, the exhaust gas flows from the rear end part toward the front end part. Note that, the exhaust gas is mixed in the inter-case piping 23 with urea supplied from the urea supply device 24 disposed on the rear end part side of the inter-case piping 23. The exhaust gas that has passed through the inter-case piping 23 flows to the SCR case 221. Inside the SCR case 221, the exhaust gas flows from the front end part toward the rear end part and is processed by the SCR device 22. The exhaust gas that has passed through the SCR case 221 is discharged to the outside via an outlet piping 222 provided at a rear end part of the SCR case 221.

2. Support Structure of Exhaust-Gas Purification Device

Subsequently, a support structure for supporting the exhaust-gas purification device 2 on the engine main-body 1 will be explained.

2-1. Outline of Support Structure

Figure 3:
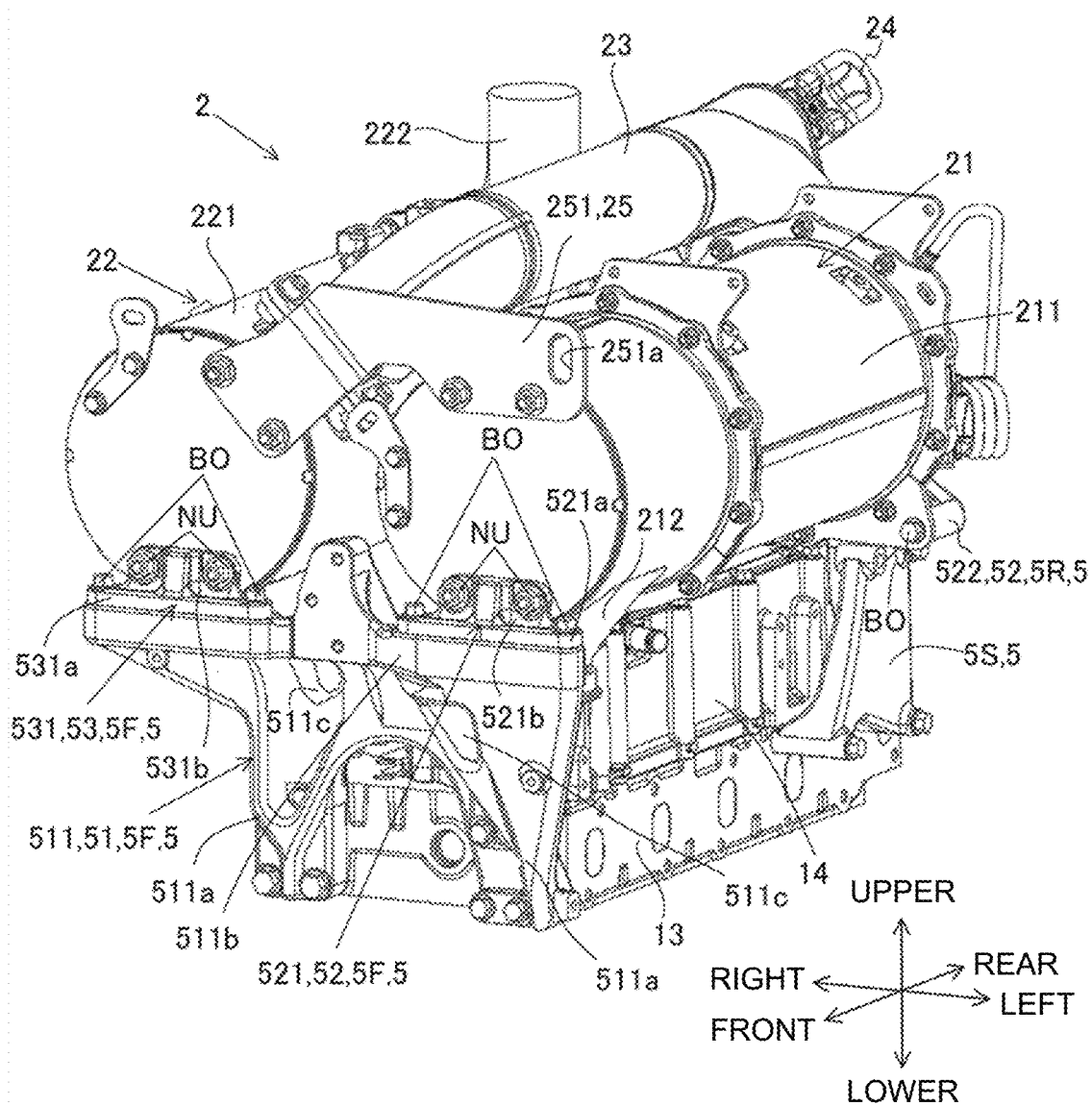
FIG. 3 is a perspective view showing a schematic constitution of a support structure of an exhaust-gas purification device.
Figure 4:
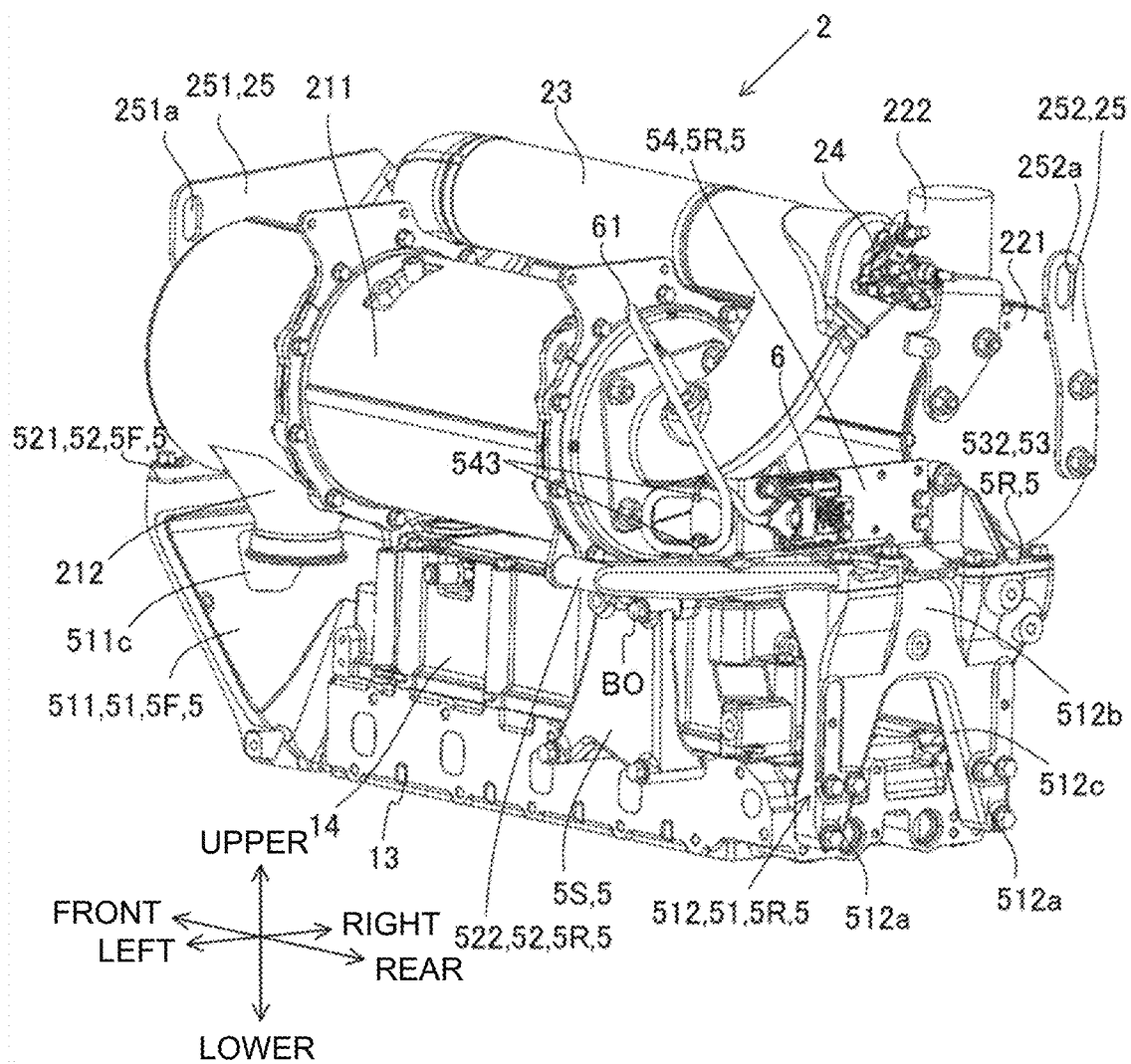
FIG. 4 is a perspective view showing a schematic constitution of the support structure of the exhaust-gas purification device.

FIG. 3 and FIG. 4 are perspective views showing a schematic constitution of a support structure of the exhaust-gas purification device 2. In FIG. 3 and FIG. 4, the support structure of the exhaust-gas purification device 2 is viewed from different directions. FIG. 3 is a view seen from diagonally front (the cooling fan 3 side). FIG. 4 is a view seen from diagonally rear (the flywheel 4 side). FIG. 3 and FIG. 4 are extracted views showing the cylinder head 13, the head cover 14, and the exhaust-gas purification device 2 that constitute the engine 100.

As shown in FIG. 3 and FIG. 4, the engine 100 includes a bracket 5 for mounting the exhaust-gas purification device 2 on the engine main-body 1. As a preferred embodiment, the bracket 5 mounts the exhaust-gas purification device 2 on the cylinder head 13. The bracket 5 is constituted by a plurality of parts (members). The plurality of parts constituting the bracket 5 are made of, for example, metal.

The bracket 5 includes a front-side mounting portion 5F mounted on the front side of the engine 100 and a rear-side mounting portion 5R mounted on the rear side of the engine 100. Since the bracket 5 is constituted to be divided into the front side and the rear side of the engine 100, a large support base is not disposed between the engine main-body 1 and the exhaust-gas purification device 2 in the up-down direction. That is, according to the constitution of this embodiment, a weight of the support structure of the exhaust-gas purification device 2 can be reduced. Note that, in this example, the bracket 5 further includes a side-surface mounting portion 5S mounted on a side surface (in detail, a left side surface) of the engine 100. Although the side-surface mounting portion 5S is not an indispensable constitution, the support strength of the exhaust-gas purification device 2 can be improved by providing the same.

Moreover, the bracket 5 includes a main-body mounting portion 51 mounted on the engine main-body 1, a first-case mounting portion 52 mounted on the DPF case (first case) 211, and a second-case mounting portion 53 mounted on the SCR case (second case) 221. Note that, in this embodiment, the main-body mounting portion 51 is mounted on the cylinder head 13. The first-case mounting portion 52 and the second-case mounting portion 53 are both mounted on the exhaust-gas purification device 2 in a broad sense.

Figure 5:
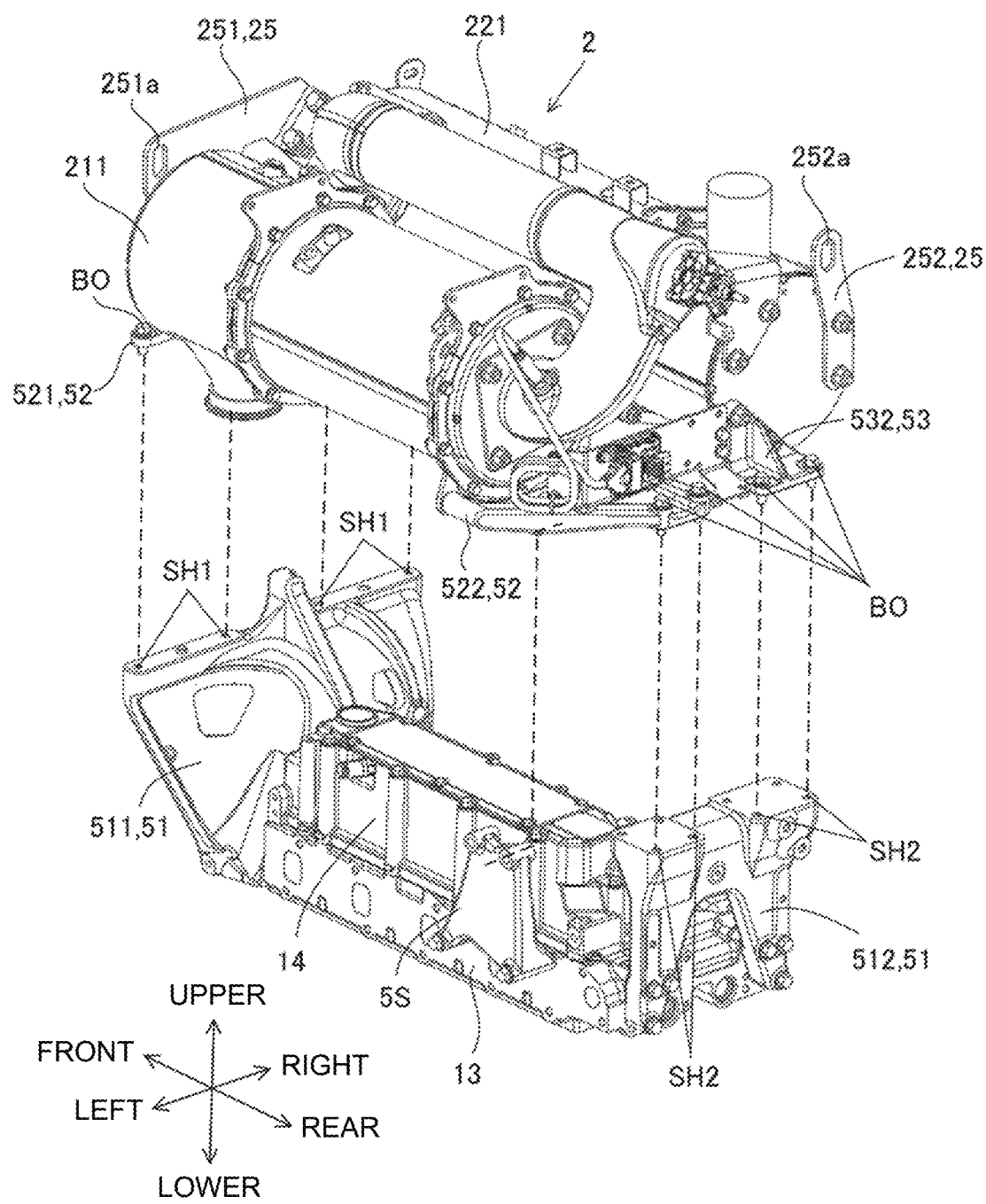
FIG. 5 is a schematic perspective view showing a part of the support structure of the exhaust-gas purification device shown in FIG. 4 in an exploded manner.

FIG. 5 is a schematic perspective view shown a part of the support structure of the exhaust-gas purification device 2 shown in FIG. 4 in an exploded manner. When the exhaust-gas purification device 2 is incorporated in the engine 100, as shown in FIG. 5, the exhaust-gas purification device 2 including the DPF case 211 and the SCR case 221 is unitized. The unitized exhaust-gas purification device 2 includes the first-case mounting portion 52 and the second-case mounting portion 53. Moreover, when the exhaust-gas purification device 2 is incorporated in the engine 100, as shown in FIG. 5, the main-body mounting portion 51 is in a state mounted on the cylinder head 13 in advance.

When the exhaust-gas purification device 2 is incorporated in the engine 100, the exhaust-gas purification device 2 is suspended by a suspending device, not shown, and is lowered from above toward the engine main-body 1 (the cylinder head 13) on which the main-body mounting portion 51 is mounted. Then, the first-case mounting portion 52 as well as the second-case mounting portion 53 and the main-body mounting portion 51 are appropriately aligned and fastened by bolting. As a result, the exhaust-gas purification device 2 is mounted on the upper side of the engine main-body 1.

Note that, in the exhaust-gas purification device 2, a suspending portion 25 that enables suspension by the suspending device is provided. As shown in FIG. 5 and the like, the suspending portion 25 is provided in the DPF case 211 and the SCR case 221. That is, the first case 211 and the second case 221 have the suspending portion 25 that enables suspension of the exhaust-gas purification device 2.

In detail, a first suspending portion 251 is provided at the front end parts of the DPF case 211 and the SCR case 221. The first suspending portion 251 is constituted by a metal piece whose longitudinal direction extends in the left-right direction. An end part on the left side of the first suspending portion 251 is mounted on a front end surface of the DPF case 211. An end part on the right side of the first suspending portion 251 is mounted on a front end surface of the SCR case 221. That is, the first suspending portion 251 connects the DPF case 211 and the SCR case 221. The first suspending portion 251 has a through hole 251a penetrating in the front-rear direction at the left end part (on the DPF case 211 side). Moreover, a second suspending portion 252 is provided at a rear end part of the SCR case 221. The second suspending portion 252 is constituted by a metal piece whose longitudinal direction extends in the up-down direction and has a through hole 252a penetrating in the front-rear direction. A lower part side of the second suspending portion 252 is fixed to the rear end surface of the SCR case 221. A linear member such as a wire is passed through each of the through hole 251a of the first suspending portion 251 and the through hole 252a of the second suspending portion 252, and the exhaust-gas purification device 2 is suspended.

2-2. Main-Body Mounting Portion

The main-body mounting portion 51 provided in the bracket 5 includes a front-side main-body mounting portion 511 and a rear-side main-body mounting portion 512 in detail. That is, the bracket 5 has the front-side main-body mounting portion 511 and the rear-side main-body mounting portion 512. Note that, in this embodiment, the main-body mounting portion 51 includes the side-surface mounting portion 5S described above. The side-surface mounting portion 5S is fastened to the left side surface (exhaust side) of the cylinder head 13 using a bolt.

As shown in FIG. 3 and the like, the front-side main-body mounting portion 511 is mounted on the front side of the engine main-body 1. That is, the front-side main-body mounting portion 511 is included in the above-described front-side mounting portion 5F. The front-side main-body mounting portion 511 has a gate-shaped structure in which upper parts of a pair of left and right leg portions 511a are connected by a leg-portion connecting portion 511b extending in the left-right direction. The front-side main-body mounting portion 511 is mounted on the cylinder head 13 by fastening each of the pair of left and right leg portions 511a to the front end surface of the cylinder head 13 using a bolt.

The front-side main-body mounting portion 511 has a vent hole 511c penetrating in the front-rear direction. By providing the vent hole 511c, the air generated by the rotation of the cooling fan 3 can be passed toward the engine main-body 1 at the position where the front-side main-body mounting portion 511 is provided. For example, a wire harness (not shown) disposed between the exhaust-gas purification device 2 and the head cover 14 in the up-down direction can be cooled by the wind.

In detail, a plurality of vent holes 511c are provided. The vent holes 511c are provided one each on each of the pair of left and right leg portions 511a. However, regarding the number and disposition of the vent holes 511c, the constitution may be different from that of this embodiment. The number of the vent holes 511c may be single. Moreover, the vent hole 511c does not have to be provided depending on the case. The wind generated by the rotation of the cooling fan 3 also passes between the pair of left and right leg portions 511a in the left-right direction.

As shown in FIG. 4 and the like, the rear-side main-body mounting portion 512 is mounted on the rear side of the engine main-body 1. That is, the rear-side main-body mounting portion 512 is included in the above-described rear-side mounting portion 5R. The rear-side main-body mounting portion 512 has a gate-shaped structure in which upper parts of a pair of left and right leg portions 512a are coupled by a leg-portion connecting portion 512b extending in the left-right direction. The rear-side main-body mounting portion 512 is mounted on the cylinder head 13 by fastening each of the pair of left and right leg portions 512a to the rear end surface of the cylinder head 13 using a bolt.

The rear-side main-body mounting portion 512 has a ventilation portion 512c through which air flows in the front-rear direction. By providing the ventilation portion 512c, the wind that has passed through the vent hole 511c of the front-side main-body mounting portion 511 can be made to flow rearward. In detail, the ventilation portion 512c is a space formed between the pair of left and right leg portions 512a in the left-right direction. However, the ventilation portion 512c may be a through hole that is provided in the rear-side main-body mounting portion 512 and penetrates in the front-rear direction.

2-3. Case Mounting Portion

The case mounting portion includes a first-case mounting portion 52 and the second-case mounting portion 53. The case mounting portion includes a case mounting portion belonging to the front-side mounting portion 5F described above and a case mounting portion belonging to the rear-side mounting portion 5R. Hereinafter, the case mounting portions will be explained in the order of the case mounting portion belonging to the front-side mounting portion 5F and the case mounting portion belonging to the rear-side mounting portion 5R.

Note that, the first-case mounting portion 52 includes a front-side first-case mounting portion 521 and a rear-side first-case mounting portion 522. The front-side first-case mounting portion 521 is a case mounting portion belonging to the front-side mounting portion 5F. The rear-side first-case mounting portion 522 is a case mounting portion belonging to the rear-side mounting portion 5R. Moreover, the second-case mounting portion 53 includes a front-side second-case mounting portion 531 and a rear-side second-case mounting portion 532. The front-side second-case mounting portion 531 is a case mounting portion belonging to the front-side mounting portion 5F. The rear-side second-case mounting portion 532 is a case mounting portion belonging to the rear-side mounting portion 5R.

2-3-1. Case Mounting Portion Belonging to Front-Side Mounting Portion

Figure 6:
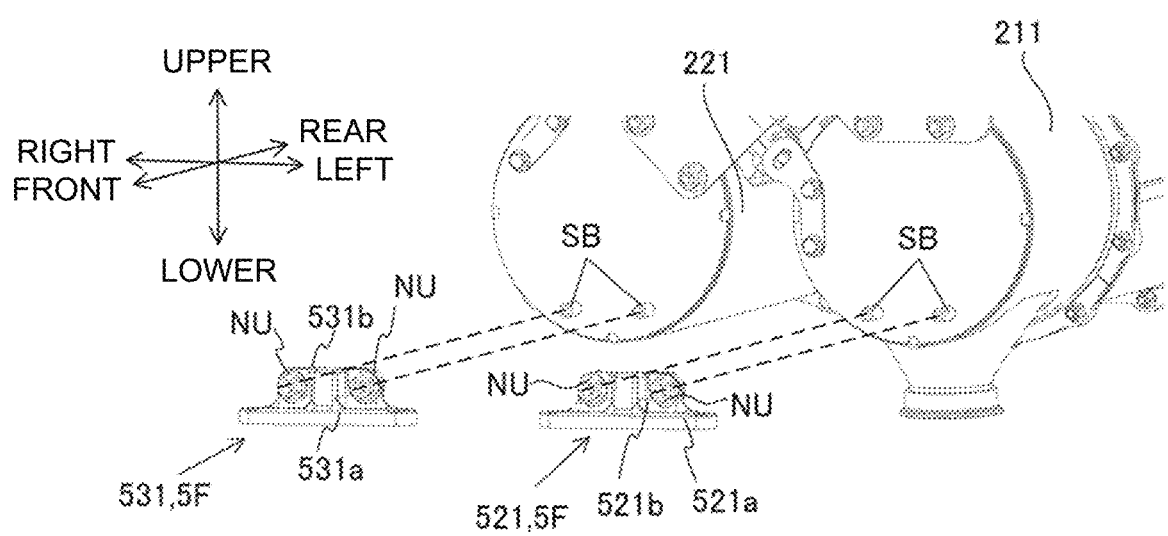
FIG. 6 is a schematic exploded perspective view showing a relationship between a case mounting portion belonging to a front-side mounting portion and a case.

FIG. 6 is a schematic exploded perspective view showing a relationship between the case mounting portions 521, 531 belonging to the front-side mounting portion 5F and the cases 211, 221.

As shown in FIG. 3, FIG. 6 and the like, the front-side first-case mounting portion 521 is mounted on a lower part of the front end surface of the DPF case 211. The front-side first-case mounting portion 521 includes a base portion 521a in the form of a horizontally extending rectangular plate and an erected portion 521b in the form of a rectangular plate erected at the rear end of the base portion 521a. Note that, the horizontal direction is a direction orthogonal to the up-down direction. Moreover, the erected portion 521b extends in a direction orthogonal to the front-rear direction. On the erected portion 521b, a pair of through-holes (not shown) disposed at an interval in the left-right direction and penetrating in the front-rear direction are provided. Note that, in FIG. 3 and FIG. 6, a nut NU is disposed in front of each of the pair of through holes, and the pair of through holes are hidden by the nut NU.

As shown in FIG. 6, a stud bolt SB protruding forward is provided on the front end surface of the DPF case 211. On the front end surface of the DPF case 211, a pair of the stud bolts SB disposed at an interval in the left-right direction are provided correspondingly to the pair of through holes provided in the erected portion 521b of the front-side first-case mounting portion 521. In a state where the stud bolt SB is inserted into the through hole provided in the erected portion 521b, the front-side first-case mounting portion 521 is fixed to the DPF case 211 by fitting and fastening the nut NU to the stud bolt SB. Note that, in this embodiment, the front-side first-case mounting portion 521 is configured to be fixed to the DPF case 211 at two spots, but the positions and the number of the fixing spots may be appropriately changed.

As shown in FIG. 3, FIG. 6 and the like, the front-side second-case mounting portion 531 is mounted on a lower part of the front end surface of the SCR case 221. The shape of the front-side second-case mounting portion 531 is similar to the shape of the front-side first-case mounting portion 521 described above and includes a base portion 531a and an erected portion 531b having a pair of through holes. Similarly to the front-side first-case mounting portion 521, the front-side second-case mounting portion 531 is fixed to the SCR case 221 by using the stud bolts SB and the nuts NU.

In each of the base portion 521a of the front-side first-case mounting portion 521 and the base portion 531a of the front-side second-case mounting portion 531, a through hole (not shown) penetrating in the up-down direction is provided at both left and right end parts. Then, screw holes SH1 (see FIG. 5) are provided in the upper surface of the front-side main-body mounting portion 511 so as to correspond to the respective through holes. When each bolt BO passed through each of the through holes is inserted into each of the screw holes SH1, the front-side first-case mounting portion 521 and the front-side second-case mounting portion 531 are fixed to the front-side main-body mounting portion 511. That is, the front-side first-case mounting portion 521 is mounted on the front-side main-body mounting portion 511. The front-side second-case mounting portion 531 is mounted on the front-side main-body mounting portion 511.

Figure 7:
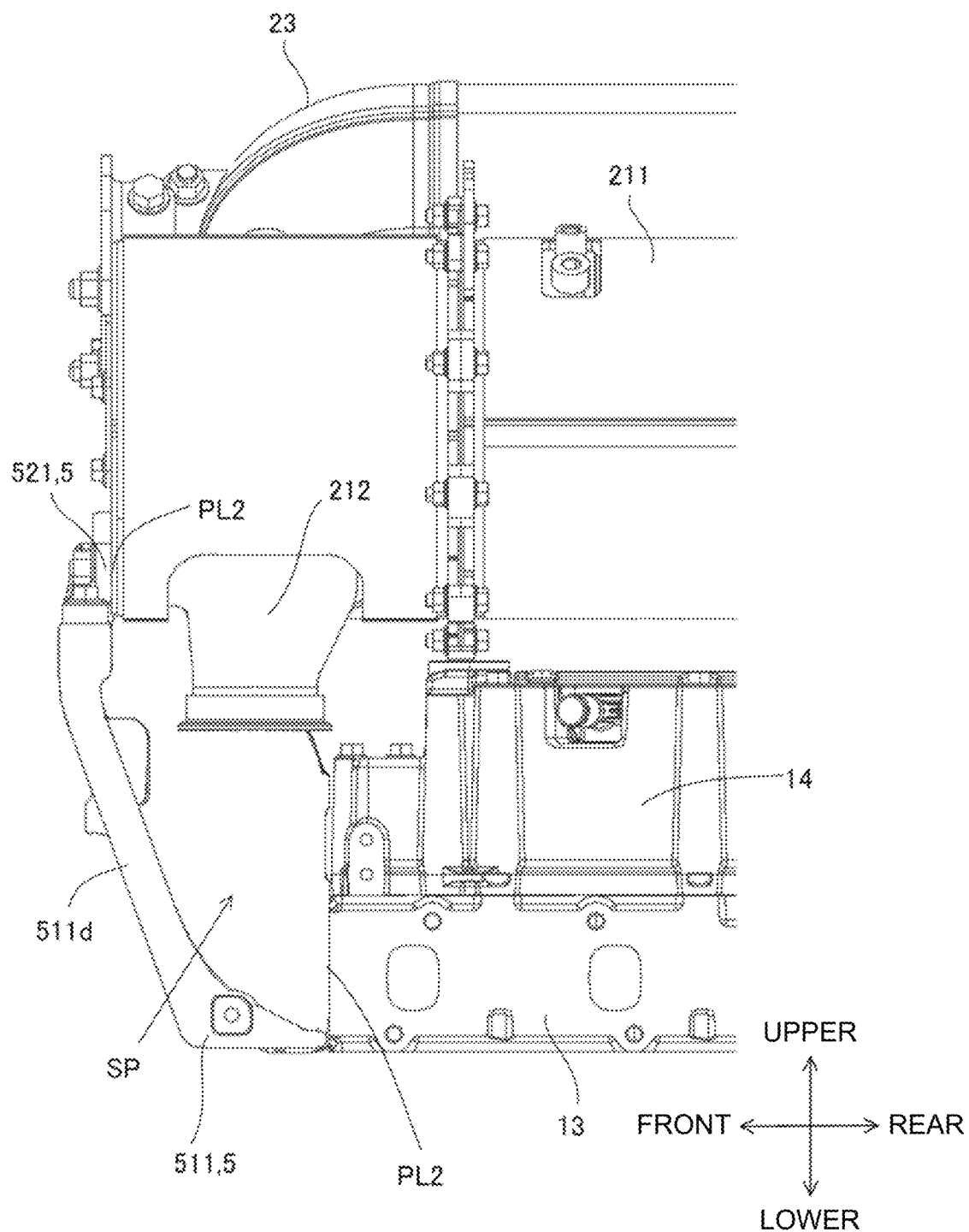
FIG. 7 is a schematic side view showing the vicinity of an inlet piping of the exhaust-gas purification device in an enlarged manner.

FIG. 7 is a schematic side view showing the vicinity of the inlet piping 212 of the exhaust-gas purification device 2 in an enlarged manner. Note that the inlet piping 212 is an inlet of the exhaust gas in the exhaust-gas purification device 2 and is disposed in a front part on the exhaust side of the engine 100. That is, in the engine 100, the inlet of the exhaust gas in the exhaust-gas purification device 2 is disposed on one side in the front-rear direction of the engine 100.

As shown in FIG. 7, the bracket 5 is constituted such that, on one side (the front side in this embodiment) in the front-rear direction, a mounting spot PL1 onto the exhaust-gas purification device 2 is offset to the exhaust gas inlet side compared as a mounting spot PL2 onto the engine main-body 1.

In detail, the mounting spot PL1 of the bracket 5 onto the exhaust-gas purification device 2 is a spot where the rear end surface of the front-side first-case mounting portion 521 and the front end surface of the DPF case 211 are in contact with each other. Note that, positions in the front-rear direction of the spot where the rear end surface of the front-side first-case mounting portion 521 and the front end surface of the DPF case 211 are in contact with each other and the spot where the rear end surface of the front-side second-case mounting portion 531 and the front end surface of the SCR case 221 are in contact with each other are the same. Moreover, the mounting spot PL2 where the bracket 5 is mounted on the engine main-body 1 is a spot where the rear end surface of the front-side main-body mounting portion 511 and the front end surface of the cylinder head 13 are in contact with each other.

The mounting spot PL1 onto the exhaust-gas purification device 2 is offset to the front side as compared with the mounting spot PL2 onto the engine main-body 1. In more detail, the mounting spot PL1 onto the exhaust-gas purification device 2 is located further front of the inlet piping 212 located front of the mounting spot PL2 onto the engine main-body 1.

The constitution as above is realized since the front surface wall of the front-side main-body mounting portion 511, mounted on the cylinder head 13 and the front-side first-case mounting portion 521, has an inclined portion 511d inclined forward from the lower part to the upper part.

With the constitution as above, a wide space SP can be ensured around (particularly, below) the inlet piping 212. As a result, workability of a mounting work of the connection pipe 19 to the inlet piping 212 and a maintenance work around the inlet piping 212 can be improved.

2-3-2. Case Mounting Portion Belonging to Rear-Side Mounting Portion

Figure 8:
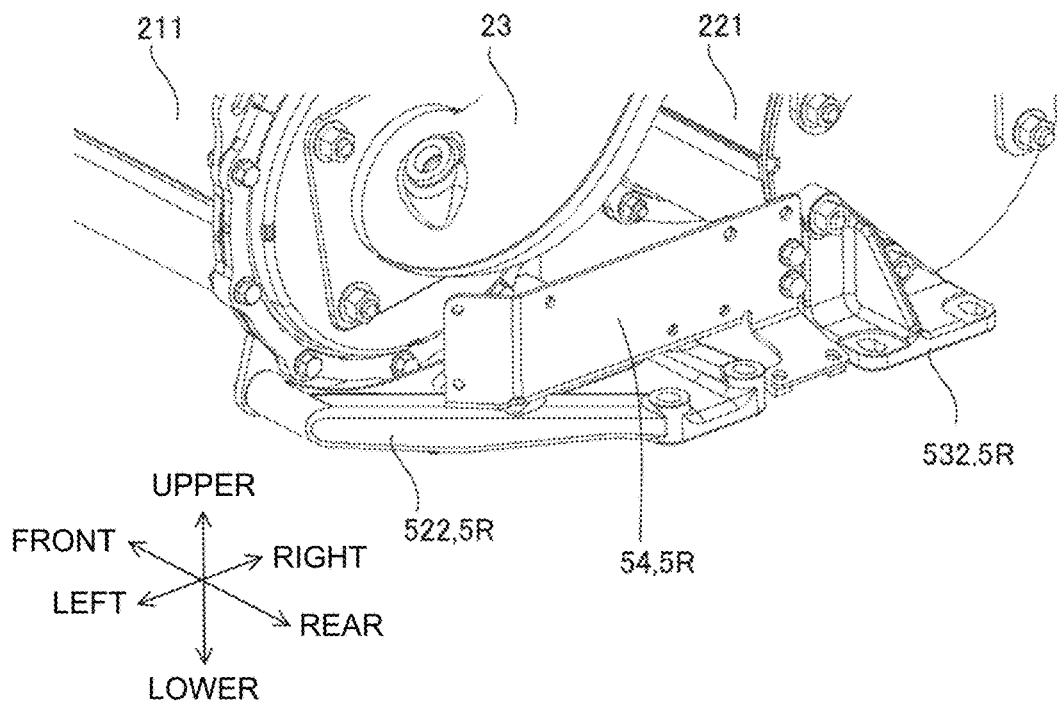
FIG. 8 is a schematic perspective view showing a relationship between the case mounting portion belonging to a rear-side mounting portion and the case.
Figure 9:
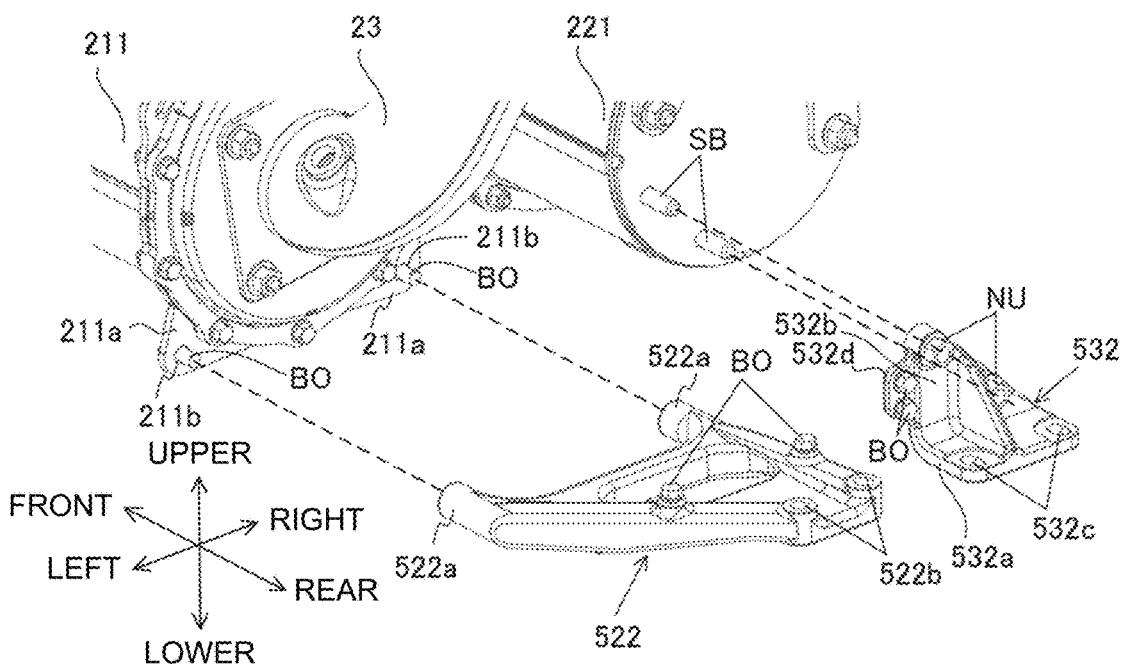
FIG. 9 is a schematic exploded perspective view showing a relationship between the case mounting portion belonging to the rear-side mounting portion and the case.

FIG. 8 is a schematic perspective view showing a relationship between the case mounting portions 522, 532 belonging to the rear-side mounting portion 5R and the cases 211, 221. Note that, as shown in FIG. 8, the rear-side mounting portion 5R includes a coupling portion 54 in addition to the rear-side first-case mounting portion 522 and the rear-side second-case mounting portion 532. That is, the bracket 5 has the coupling portion 54. Details of the coupling portion 54 will be described later. FIG. 9 is a schematic exploded perspective view showing a relationship between the case mounting portions 522, 532 belonging to the rear-side mounting portion 5R and the cases 211, 221. Note that, in FIG. 9, description of the coupling portion 54 is omitted.

As shown in FIGS. 4, 8, 9, and the like, the rear-side first-case mounting portion 522 is mounted on a lower part on the rear end side of the DPF case 211.

Figure 10:
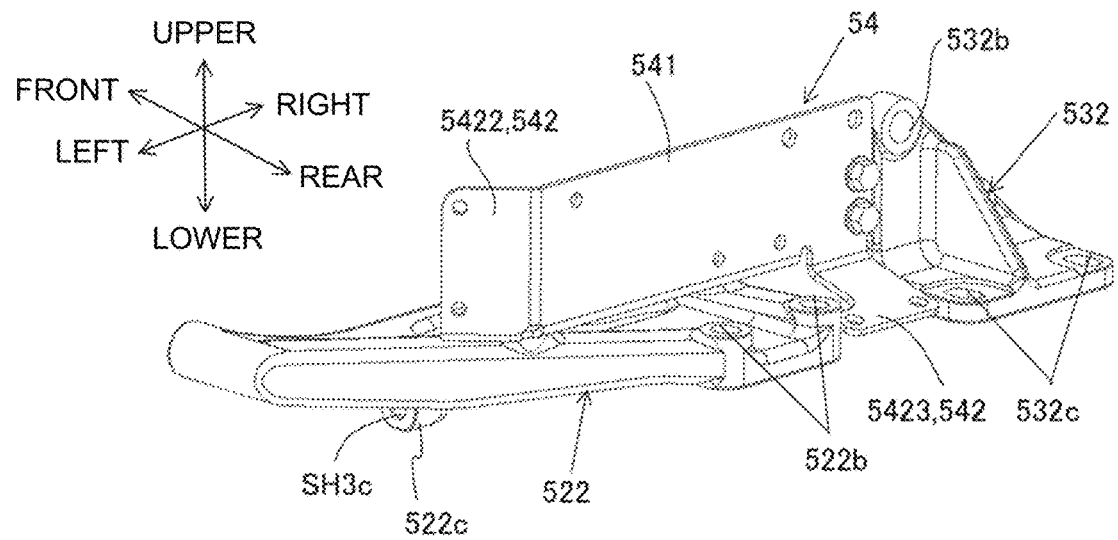
FIG. 10 is a schematic perspective view showing a relationship between a coupling portion and a rear-side first-case mounting portion as well as a rear-side second-case mounting portion.
Figure 11:
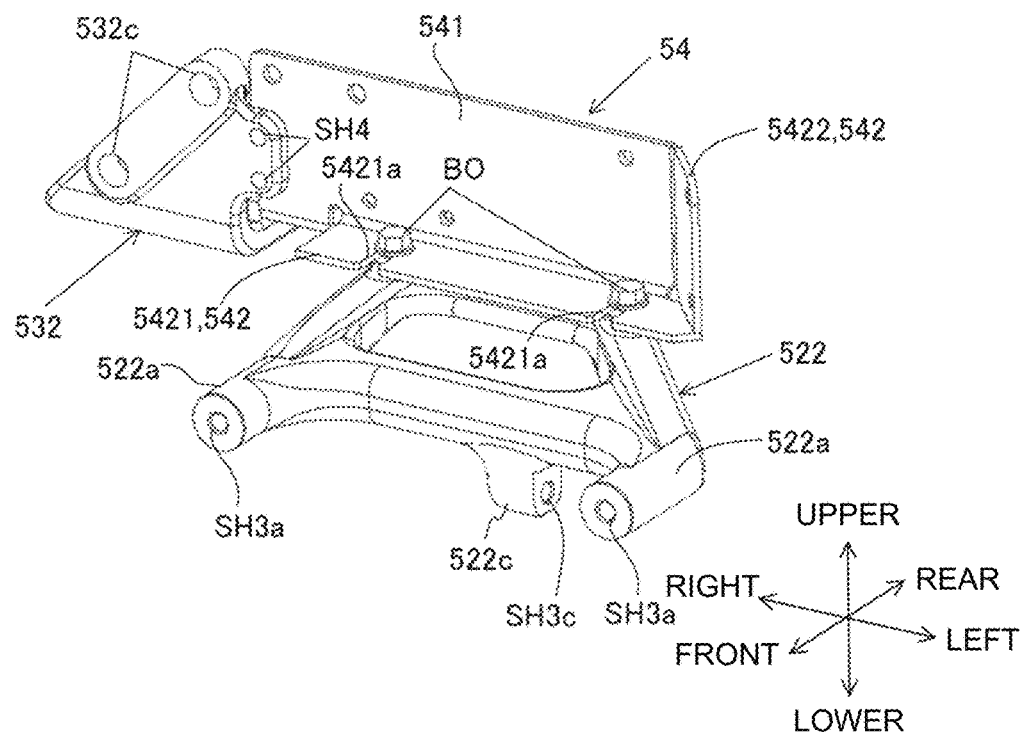
FIG. 11 is a schematic perspective view showing a relationship between the coupling portion and the rear-side first-case mounting portion as well as the rear-side second-case mounting portion.

The rear-side first-case mounting portion 522 is constituted with a plate shape. The rear-side first-case mounting portion 522 has a substantially trapezoidal shape having a long side on the front side and a short side on the rear side on a plan view from above. The rear-side first case mounting portion 522 has a pair of cylinder portions 522a extending in the front-rear direction on the left end and the right end on the front end side. A female thread is constituted on an inner surface of the cylinder portion 522a. In other words, each of the pair of cylinder portions 522a has a screw hole SH3a (see FIG. 11 and FIG. 12, which will be described later) extending from the front to the rear. Moreover, the rear-side first-case mounting portion 522 has through holes 522b penetrating in the up-down direction on the left end and the right end on the rear end part. Moreover, the rear-side first-case mounting portion 522 has screw holes SH3b (see FIG. 12, which will be described later) extending from the upper side to the lower side at the left end and the right end of an intermediate portion in the front-rear direction. Note that, in FIG. 9, the bolt BO is inserted into the screw hole SH3b. Moreover, as shown in FIG. 10 and FIG. 11, which will be described later, the rear-side first-case mounting portion 522 has a protruding portion 522c that protrudes downward. The protruding portion 522c has a screw hole SH3c extending from the left side to the right side.

The DPF case 211 has, on a rear end part thereof, a protruding piece 211a that protrudes outward in a radial direction with a center axis of the case from the outer circumferential surface as a reference. In detail, the DPF case 211 has a protruding piece 211a on the lower part on the left and right. Each of the pair of protruding pieces 211a provided on the left and right has a through hole 211b (see FIG. 9) penetrating in the front-rear direction.

The rear-side first-case mounting portion 522 is fixed to the DPF case 211 by inserting each of the bolts BO, which is passed through the through hole 211b provided in each of the pair of protruding pieces 211a, into the screw hole SH3a of each of the pair of cylinder portions 522a. Moreover, each of the bolts BO passed through the pair of through holes 522b provided on the rear end part of the rear-side first-case mounting portion 522 is inserted into screw hole SH2 (see FIG. 5) provided in the upper surface of the rear-side main-body mounting portion 512, whereby the rear-side first-case mounting portion 522 is fixed to the rear-side main-body mounting portion 512. That is, the rear-side first-case mounting portion 522 is mounted on the rear-side main-body mounting portion 512.

Note that, in this embodiment, the rear-side first-case mounting portion 522 is mounted on the side-surface mounting portion 5S as shown in FIG. 4 and the like. The rear-side first-case mounting portion 522 is fixed to the side-surface mounting portion 5S by inserting the bolt BO, which is passed through a through hole, not shown, provided in an upper part of the side-surface mounting portion 5S, into the screw hole SH3c provided in the protruding portion 522c. As a result, movement (vibration) of the rear-side first-case mounting portion 522 in the left-right direction can be suppressed.

As shown in FIGS. 4, 8, 9, and the like, the rear-side second-case mounting portion 532 is mounted on a lower part on the rear end side of the SCR case 221.

The rear-side second-case mounting portion 532 has a bottom wall portion 532a having a rectangular plate shape extending in the horizontal direction and a vertical wall portion 532b having a triangular plate shape formed by being bent upward from the rear end of the bottom wall portion 532a. The vertical wall portion 532b extends in a direction orthogonal to the front-rear direction. A pair of through holes 532c (see FIGS. 10, 11, and 13, which will be described later) penetrating in the front-rear direction are provided in an upper left part and a lower right part of the vertical wall portion 532b. Note that, in FIG. 8 and FIG. 9, the nut NU is disposed on the rear of each of the pair of through holes 532c, and the pair of through holes are hidden by the nut NU.

Moreover, the through holes 532c penetrating in the up-down direction are provided at the left end and the right end on the rear side of the bottom wall portion 532a. Moreover, an extension piece 532d extending in a left direction is provided at an upper part of the left end of the vertical wall portion 532b. Screw holes SH4 (see FIG. 13 and the like, which will be described later) penetrating in the front-rear direction are provided in the rectangular extension piece 532d. In detail, two pieces of the screw holes SH4 are provided at an interval in the up-down direction. Note that, in FIG. 9, the bolts BO are inserted into the pair of screw holes SH4.

A stud bolt SB protruding rearward is provided on a lower part of a rear end surface of the SCR case 221. Two pieces of the stud bolts SB are provided correspondingly to the pair of through holes 532c provided in the vertical wall portion 532b. In a state where each of the two stud bolt SB is passed through each of the through holes 532c provided in the vertical wall portion 532b, the rear-side second-case mounting portion 532 is fixed to the SCR case 221 by fitting and fastening the nut NU to the stud bolt SB.

Moreover, each of the bolts BO passed through the pair of left and right through holes 532c provided in the bottom wall portion 532a is inserted into the screw hole SH2 (see FIG. 5) provided in an upper surface of the rear-side main-body mounting portion 512, whereby the rear-side second-case mounting portion 532 is fixed to the rear-side main-body mounting portion 512. That is, the rear-side second-case mounting portion 532 is mounted on the rear-side main-body mounting portion 512.

As shown in FIG. 8 and the like, the coupling portion 54 couples the first-case mounting portion 52 and the second-case mounting portion 53 to each other. By providing the coupling portion 54, the support strength of the exhaust-gas purification device 2 using the first-case mounting portion 52 and the second-case mounting portion 53 can be improved. That is, when the exhaust-gas purification device 2 is supported, it is possible to suppress lowering in the support strength of the exhaust-gas purification device 2 even though a large support base extending in the horizontal direction is eliminated so as to promote weight reduction.

In this embodiment, the coupling portion 54 couples the rear-side first-case mounting portion 522 and the rear-side second-case mounting portion 532 to each other. Note that, in this embodiment, the coupling portion 54 is included only in the rear-side mounting portion 5R but may be included in the front-side mounting portion 5F. That is, the coupling portion 54 may have such a constitution that includes at least one of a front-side coupling portion that couples the front-side first-case mounting portion 521 and the front-side second-case mounting portion 531 and a rear-side coupling portion that couples the rear-side first-case mounting portion 522 and the rear-side second-case mounting portion 532.

In this embodiment, as described above, the rear-side coupling portion 54 that couples the rear-side first-case mounting portion 522 and the rear-side second-case mounting portion 532 is provided. With the constitution as above, when the exhaust-gas purification device 2 is suspended by using the first suspending portion 251 and the second suspending portion 252 (see FIG. 5 and the like), the DPF case 211 and the SCR case 221 can be prevented from being separated from each other. That is, when the exhaust-gas purification device 2 is suspended in order to incorporate the exhaust-gas purification device 2 in the engine 100, occurrence of such a situation that the inter-case piping 23 is deformed or the like can be prevented, for example.

In this embodiment, as shown in FIG. 4 and the like, the electronic component 6 is mounted on the coupling portion 54. The electronic component 6 may be, for example, a sensor, a part of a sensor, or a connector. When the electronic component 6 is a sensor, the sensor may be, for example, an NOx sensor, a differential pressure sensor, a temperature sensor, or the like. In this embodiment, the electronic component 6 is a part of the NOx sensor. A part of the NOx sensor may be, for example, a processing portion that receives information from a sensing portion of the NOx sensor and processes the received information. The processing portion may be constituted to include an IC chip, for example. The electronic component 6 constituted as a part of the NOx sensor outputs the processed information (data) to a host controller (not shown).

By configuring such that the electronic component 6 is mounted on the coupling portion 54, the electronic component 6 can be disposed away from a heat source such as the DPF case 211. Moreover, when the exhaust-gas purification device 2 is incorporated in the engine 100, the coupling portion 54 is mounted on the exhaust-gas purification device 2 similarly to the first-case mounting portion 52 and the second-case mounting portion 53. That is, when the electronic component 6 is configured to be mounted on the coupling portion 54, the electronic component 6 can also be included in the unitized exhaust-gas purification device 2 so as to perform the above-described incorporating work. As a result, an increase in work man-hours can be suppressed. Moreover, the coupling portion 54 is disposed on a lower part of the exhaust-gas purification device 2. Therefore, by configuring such that the electronic component 6 is disposed on the coupling portion 54, the electronic component 6 can be disposed in a place where vibration is as small as possible.

Figure 12:
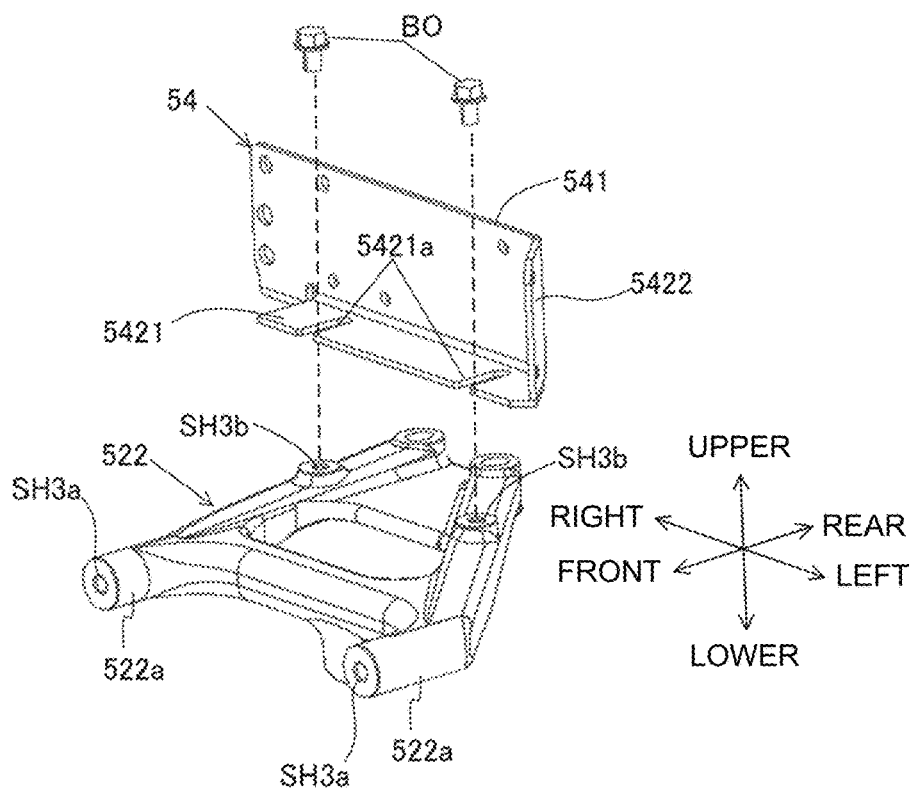
FIG. 12 is a schematic exploded perspective view showing a relationship between the coupling portion and the rear-side first-case mounting portion.
Figure 13:
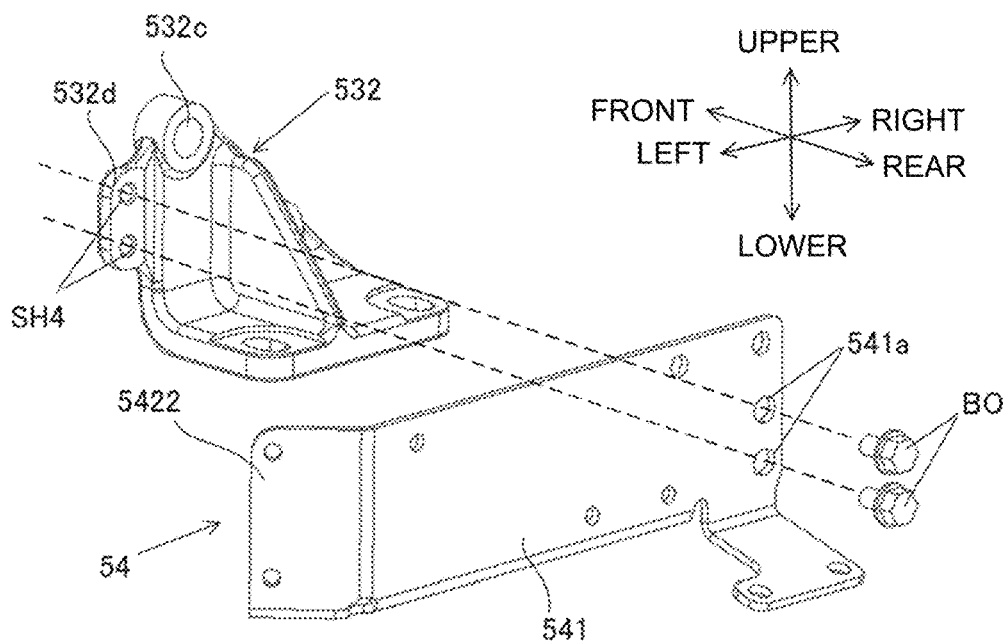
FIG. 13 is a schematic exploded perspective view showing a relationship between the coupling portion and the rear-side second-case mounting portion.

FIG. 10 and FIG. 11 are schematic perspective views showing the relationship between the coupling portion 54 and the rear-side first-case mounting portion 522 as well as the rear-side second-case mounting portion 532. FIG. 10 and FIG. 11 differ in the direction in which the object is viewed. FIG. 10 is a view of the object as viewed from diagonally front, and FIG. 11 is a view of the object as viewed from diagonally rear. Moreover, FIG. 12 is a schematic exploded perspective view showing a relationship between the coupling portion 54 and the rear-side first-case mounting portion 522. FIG. 13 is a schematic exploded perspective view showing the relationship between the coupling portion 54 and the rear-side second-case mounting portion 532.

As shown in FIGS. 4, 10, 11, and the like, the coupling portion 54 includes an installation portion 541 and a bent portion 542. The electronic component 6 is installed in the installation portion 541. The bent portion 542 is constituted by being bent with respect to the installation portion 541. By constituting such that the coupling portion 54 includes the bent portion, mounting of the rear-side first-case mounting portion 522 and the rear-side second-case mounting portion 532 having the different shapes can be made easy.

In detail, the installation portion 541 has a rectangular plate shape whose longitudinal direction extends in the left-right direction. The bent portion 542 has a first bent portion 5421 and a second bent portion 5422. The first bent portion 5421 is bent from a lower end of the installation portion 541 to one side (the front side in this embodiment) in the front-rear direction. The second bent portion 5422 is bent from one end in the left-right direction of the installation portion 541 (the left end in this embodiment) to one side (the front side in this embodiment) in the front-rear direction. Since the first bent portion 5421 and the second bent portion 5422 are bent in the same direction with respect to the installation portion 541, they can be connected to each other. By means of this connection, the strength of the coupling portion 54 can be enhanced so as to suppress vibration.

The plate-like installation portion 541 is disposed orthogonal to the front-rear direction. The plate-like first bent portion 5421 extends in the horizontal direction. The plate-like second bent portion 5422 is inclined with respect to the front-rear direction and to the left-right direction. A left end part of the first bent portion 5421 and a lower end part of the second bent portion 5422 are connected to each other by welding. Note that, in this embodiment, the coupling portion 54 includes a third bent portion 5423 that is bent rearward with respect to the installation portion 541, but the third bent portion 5423 does not have to be provided.

Moreover, the electronic component 6 may be mounted on either one of the front surface and the rear surface of the installation portion 541, but in this embodiment, the electronic component 6 is mounted on the rear surface of the installation portion 541 as a preferred form. As a result, the electronic component 6 can be disposed away from a heat source such as the inter-case piping 23, for example. The electronic component 6 is fixed to the installation portion 541 by using a bolt, for example.

Moreover, in this embodiment, a fixing portion 543 for fixing a cable 61 constituting the NOx sensor is provided in the second bent portion 5422 (see FIG. 4). The fixing portion 543 is a band, for example. By providing the fixing portion 543, the cable 61 can be organized in a compact manner. The fixing portion 543 is provided on a surface on a rear side of the second bent portion 5423.

As shown in FIG. 11 and FIG. 12, a pair of notched portions 5421a disposed with an interval in the left-right direction are provided in the first bent portion 5421 of the coupling portion 54. The notched portion 5421a extends rearward from the front end of the first bent portion 5421. The interval between the pair of notched portions 5421a in the left-right direction corresponds to the interval in the left-right direction between the pair of screw holes SH3b provided in the rear-side first-case mounting portion 522.

The coupling portion 54 is disposed above the rear-side first-case mounting portion 522. The coupling portion 54 is fixed to the rear-side first-case mounting portion 522 by two pieces of the bolts BO which are inserted into the pair of screw holes SH3b provided in the rear-side first-case mounting portion 522 through the pair of notched portions 5421a. In this embodiment, the bolt BO is configured to be passed through the notched portion 5421a, but a through hole may be used instead of the notched portion 5421a. However, in the case of the constitution in which the notched portion 5421a is used as in this embodiment, the coupling portion 54 can be mounted on the rear-side first-case mounting portion 522 while being moved from the rear to the front in a state where the bolt BO is fitted in the screw hole SH3b in advance. When the mounting as above is performed, the coupling portion 54 can be mounted on the rear-side first-case mounting portion 522 efficiently by reducing an influence of the inter-case piping 23 existing above.

As shown in FIG. 10 and FIG. 13, a pair of through holes 541a disposed at an interval in the up-down direction are provided in a right end part of the installation portion 541 of the coupling portion 54. The through hole 541a penetrates the installation portion 541 in the front-rear direction. The interval in the up-down direction between the pair of through holes 541a corresponds to the interval in the up-down direction between the pair of screw holes SH4 provided in the extension piece 532d of the rear-side second-case mounting portion 532.

The coupling portion 54 is disposed in front of the extension piece 532d of the rear-side second-case mounting portion 532. The coupling portion 54 is fixed to the rear-side second-case mounting portion 532 by two pieces of the bolts BO which are inserted into the pair of screw holes SH4 provided in the extension piece 532d through the pair of through holes 541a provided in the installation portion 541.

As can be seen from the above, the coupling portion 54 is fixed to the rear-side first-case mounting portion 522 by the bolt BO fastened in the up-down direction. Moreover, the coupling portion 54 is mounted on the rear-side second-case mounting portion 532 by the bolt BO fastened in the front-rear direction. By constituting as above, the vibration in a plurality of directions in the coupling portion 54 can be suppressed.

3. Notes and the Like

Various technical features disclosed in this description can be changed in various ways without departing from the spirit of the technical creation thereof. In addition, the plural embodiments and modifications described in the present specification may be combined to the extent possible.

4. Appendix

An exemplary engine of the present invention may be so configured that an engine main-body, an exhaust-gas purification device including a first case and a second case, and a bracket for mounting the exhaust-gas purification device on the engine main-body are provided, and the bracket has a first-case mounting portion mounted on the first case, a second-case mounting portion mounted on the second case, and a coupling portion coupling the first-case mounting portion and the second-case mounting portion (first configuration).

In the engine of the first configuration, it may be so configured that an electronic component is mounted on the coupling portion (second configuration).

In the engine of the second configuration, it may be so configured that the coupling portion has an installation portion in which the electronic component is installed and a bent portion configured to be bent with respect to the installation portion (third configuration).

In the engine of the third configuration, it may be so constituted that a longitudinal direction of the installation portion extends in the left-right direction, and the bent portion includes a first bent portion that is bent from a lower end of the installation portion to one side in the front-rear direction, and a second bent portion that is bent from one end in the left-right direction of the installation portion to one side in the front-rear direction (fourth configuration).

The engine of any one of the first to fourth configurations may be so constituted that a cooling fan disposed in front of the engine main-body and a flywheel disposed on the rear of the engine main-body are provided, the bracket has the front-side main-body mounting portion mounted on the front side of the engine main-body, and the front-side main-body mounting portion has a vent hole penetrating in the front-rear direction (fifth configuration).

In the engine of the fifth configuration, it may be so constituted that the bracket has a rear-side main-body mounting portion mounted on the rear side of the engine main-body, and the rear-side main-body mounting portion has a ventilation portion through which wind is made to flow in the front-rear direction (sixth configuration).

In the engine of the sixth configuration, it may be so configured that the first-case mounting portion has the front-side first-case mounting portion mounted on the front-side main-body mounting portion and the rear-side first-case mounting portion mounted on the rear-side main-body mounting portion, the second-case mounting portion has the front-side second-case mounting portion mounted on the front-side main-body mounting portion and the rear-side second-case mounting portion mounted on the rear-side main-body mounting portion, and the coupling portion has at least either one of the front-side coupling portion coupling the front-side first-case mounting portion and the front-side second-case mounting portion and the rear-side coupling portion coupling the rear-side first-case mounting portion and the rear-side second-case mounting portion (seventh configuration).

In the engine of any one of the first to seventh configurations, it may be so configured that the longitudinal directions of the first case and the second case extend in the front-rear direction, an exhaust gas inlet of the exhaust-gas purification device is disposed on one side in the front-rear direction of the engine, and the bracket is configured such that, on the one side, a mounting spot onto the exhaust-gas purification device is offset to the inlet side as compared with a mounting spot onto the engine main-body (eighth configuration).

In the engine having any one of the first to eighth configurations, it may be so configured the first case and the second case have a suspending portion that enables suspension of the exhaust-gas purification device (ninth configuration).

REFERENCE SIGNS LIST

1 Engine main-body
2 Exhaust-gas purification device
3 Cooling fan
4 Flywheel
5 Bracket
6 Electronic component
25 Suspending portion
52 First-case mounting portion
53 Second-case mounting portion
54 Coupling portion
211 DPF case (first case)
221 SCR case (second case)
511 Front-side main-body mounting portion
511c Vent hole
512 Rear-side main-body mounting portion
512c Ventilation portion
521 Front-side first-case mounting portion
522 Rear-side first-case mounting portion
531 Front-side second-case mounting portion
532 Rear-side second-case mounting portion
541 Installation portion
542 Bent portion
5421 First bent portion
5422 Second bent portion

The invention claimed is:

1. An engine comprising: an engine main-body;
an exhaust-gas purification device having a first case and a second case; and
a bracket for mounting the exhaust-gas purification device on the engine main-body; wherein
the bracket has:
a first-case mounting portion mounted on the first case;
a second-case mounting portion mounted on the second case;
a coupling portion coupling the first-case mounting portion and the second-case mounting portion; and
an electronic component is mounted on the coupling portion and installed on an installation portion of the coupling portion, wherein the coupling portion further includes a bent portion that is bent with respect to the installation portion, wherein a cable is connected to the bent portion.

2. The engine according to claim 1, wherein a longitudinal direction of the installation portion extends in a left-right direction; and the bent portion has: a first bent portion that is bent from a lower end of the installation portion to one side in a front-rear direction; and a second bent portion that is bent from one end in the left-right direction of the installation portion to one side in the front-rear direction.

3. The engine according to claim 1, further comprising:
a cooling fan disposed in front of the engine main-body; and
a flywheel disposed on a rear of the engine main-body, wherein
the bracket has a front-side main-body mounting portion mounted on a front side of the engine main-body; and
the front-side main-body mounting portion has a vent hole penetrating in a front-rear direction.

4. The engine according to claim 3, wherein the bracket has a rear-side main-body mounting portion mounted on a rear side of the engine main-body; and
the rear-side main-body mounting portion has a ventilation portion through which wind is made to flow in a front-rear direction.

5. The engine according to claim 4, wherein
the first-case mounting portion has:
a front-side first-case mounting portion mounted on the front-side main-body mounting portion; and
a rear-side first-case mounting portion mounted on the rear-side main-body mounting portion;

the second-case mounting portion has:
- a front-side second-case mounting portion mounted on the front-side main-body mounting portion; and
- a rear-side second-case mounting portion mounted on the rear-side main-body mounting portion; and the coupling portion has at least either one of a front-side coupling portion coupling the front-side first-case mounting portion and the front-side second-case mounting portion and a rear-side coupling portion coupling the rear-side first-case mounting portion and the rear-side second-case mounting portion.

6. The engine according to claim 1, wherein longitudinal directions of the first case and the second case extend in a front-rear direction;

an exhaust gas inlet of the exhaust-gas purification device is disposed on one side in a front-rear direction of the engine; and in the bracket, on the one side, a mounting spot onto the exhaust-gas purification device is offset to the inlet side as compared with a mounting spot onto the engine main-body.

7. The engine according to claim 1, wherein the first case and the second case have a suspending portion that enables suspension of the exhaust-gas purification device.

\* \* \* \* \*